Nov. 7, 1967 F. O. BELLMER 3,351,271
UNLOADING DEVICE FOR RECIPROCATING COMPRESSORS
Filed Nov. 2, 1965 2 Sheets-Sheet 1
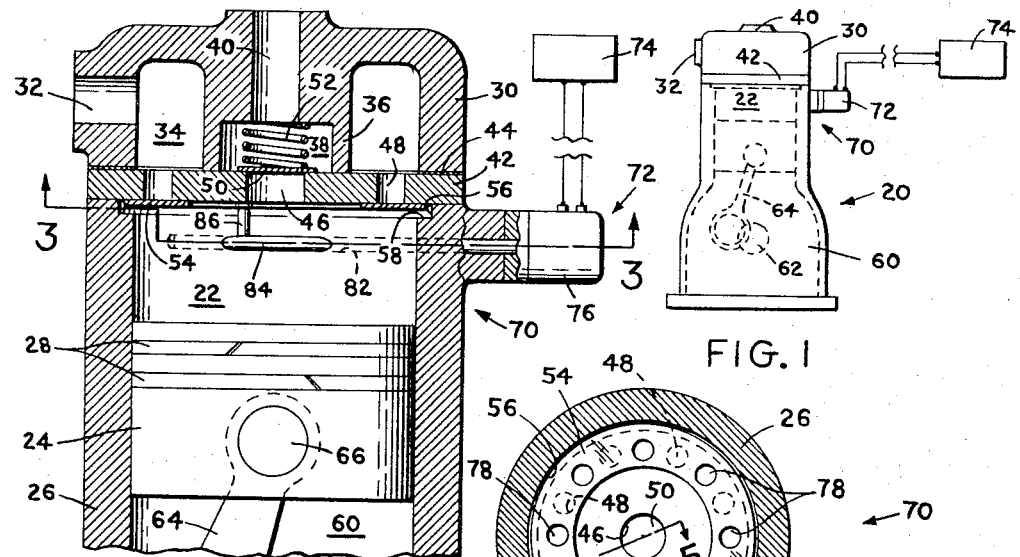
FIG. 1
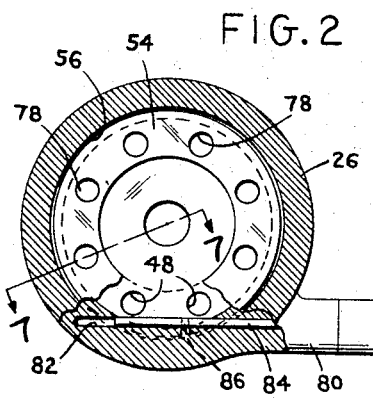
FIG. 2
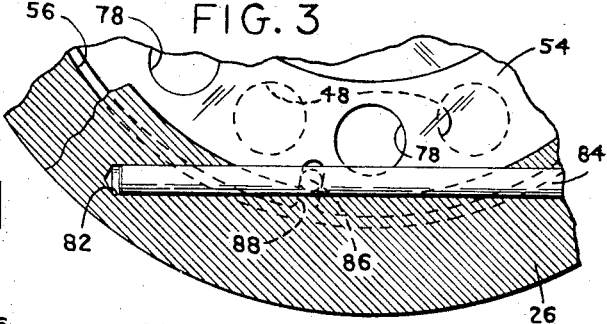
FIG. 3
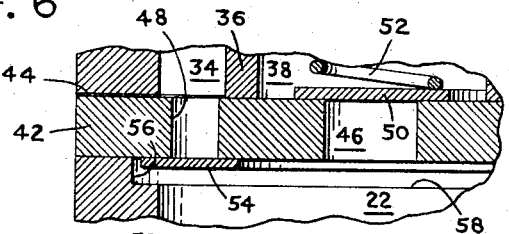
FIG. 6  FIG. 4
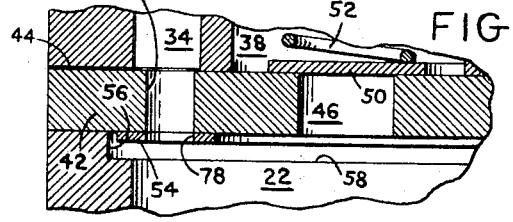
FIG. 5
FIG. 7
FRIEDRICH O. BELLMER
*INVENTOR.*
BY Daniel H. Bobis
Atty

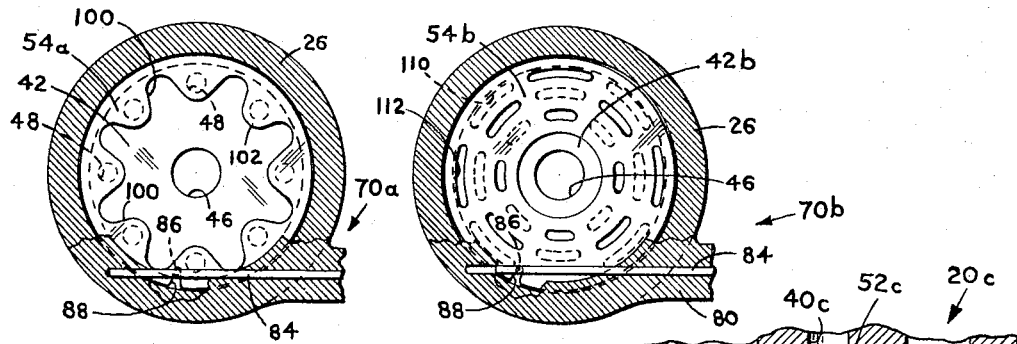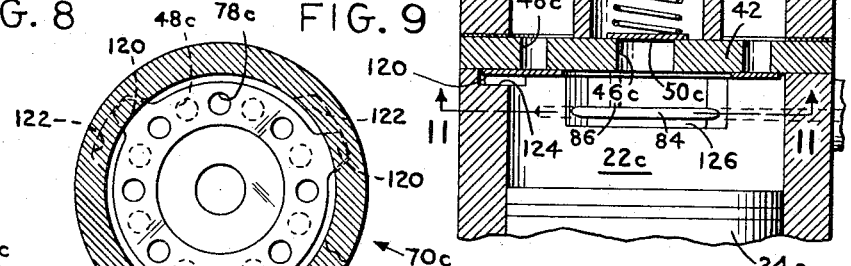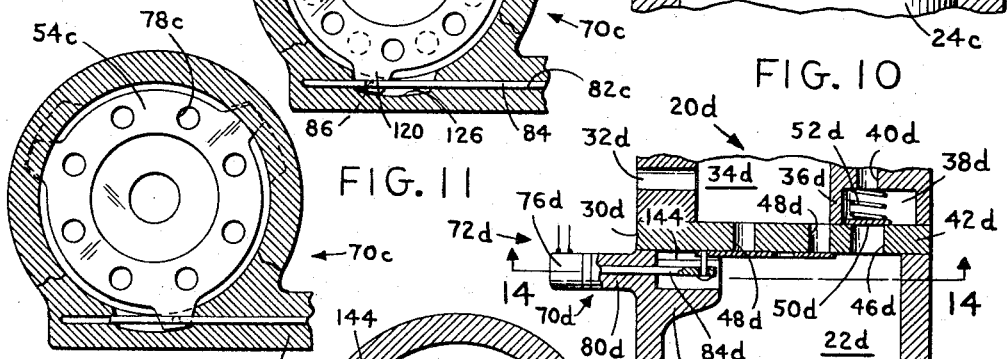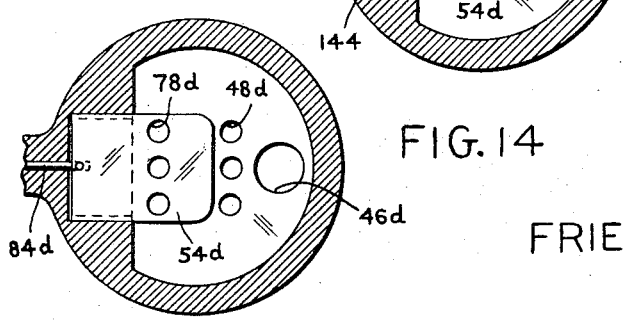
FRIEDRICH O. BELLMER
INVENTOR.

United States Patent Office 3,351,271
Patented Nov. 7, 1967

3,351,271
UNLOADING DEVICE FOR RECIPRO-
CATING COMPRESSORS
Friedrich O. Bellmer, East Orange, N.J., assignor to
Worthington Corporation, Harrison, N.J., a corporation of Delaware
Filed Nov. 2, 1965, Ser. No. 506,073
2 Claims. (Cl. 230—24)

ABSTRACT OF THE DISCLOSURE

A reciprocating compressor unloading device including an automatic ring plate inlet valve having openings therein and means for rotating the valve to align the openings with the inlet valve port so as to unload the cylinder.

---

This invention relates to reciprocating compressors. More particularly, the invention relates to an unloading device for reciprocating compressors.

Heretofore unloading devices for reciprocating compressors have had one or more of the following disadvantages; they had complex structures, were very expensive, required high actuating forces, presented sealing problems, especially during non-use, adversely affected cylinder volume, and required costly auxiliary systems of a hydraulic, mechanical or electrical type. One type of prior art unloading device uses a pressure controlled valve and a check valve to provide discharge pressure relief directly to the suction side of the compressor. Not only is such a system very costly but it requires the use of high actuating forces to operate. Another known type of unloading device uses a lifting device whereby the suction valve is forced to remain open thereby eliminating pressure build-up in the cylinder. Such a device is commonly hydraulically operated and arranged as a second cylinder around the cylinder liner, has a high friction so as to require high actuating forces, requires space within a cylinder so as to decrease its volumteric efficiency, causes sealing problems and is expensive.

Accordingly, it is an object of the present invention to provide a novel unloading device for a reciprocating compressor which overcomes the prior art disadvantages; which is simple, reliable and economical; which may be located within the cylinder without substantially decreasing its volumetric efficiency; which does not require high actuating forces; which does not cause sealing problems; which is associated with actuating means located within the cylinder head.

Another object of this invention is to provide a novel unloading device for a reciprocating compressor having openings therein which when positioned in alignment with the suction ports will continually unload the cylinder and when not in alignment with the suction ports will permit normal loading of the cylinder.

Another object of this invention is to provide a novel unloading device for a reciprocating compressor which utilizes a strip or ring shaped suction valve that in one position is capable of operating in a normal manner responsive to pressure differences exerted on either side thereof to open or close the suction ports communicating the suction inlet and the cylinder, while in the other position will remain continuously open thus preventing pressure build-up in the cylinder.

Still another object of this invention is to provide a novel unloading device for a reciprocating compressor which utilizes a suction valve having openings therein disposable in either of two operative positions, one with the holes in alignment with the suction ports during unloading of the cylinder and the other with the holes in non-alignment with the suction ports during normal operation so that the suction valve will move to open or close the suction ports responsive to the pressure difference exerted on either side thereof.

Other objects and advantages will be apparent from the following description of several embodiments of the invention and the novel features will be particularly pointed out hereinafter in the claims; reference being had to the accompanying drawings forming a part of this specification wherein like reference characters designate corresponding parts in the several views. Furthermore, the phraseology or terminology employed herein is for purpose of description and not of limitation.

In the drawings:

FIGURE 1 is an illustration of a reciprocating compressor embodying the present invention.

FIGURE 2 is a vertical section of the reciprocating compressor.

FIGURE 3 is a sectional view taken at line 3—3 of FIGURE 2, and shows the novel unloading device with the openings in the non-aligned position.

FIGURE 4 is an enlarged sectional view of the connection between the valve ring and the control rod.

FIGURE 5 is a sectional view taken along line 5—5 of FIGURE 3.

FIGURE 6 is a sectional view of the novel unloading device with the openings in the aligned poistion.

FIGURE 7 is a sectional view taken along lines 7—7 of FIGURE 6.

FIGURE 8 is a sectional view of a form of the novel unloading device using a valve having cutouts and appearing in the non-aligned position.

FIGURE 9 is a sectional view of a form of the novel unloading device using a valve having slots and appearing in the non-aligned position.

FIGURE 10 is a vertical section of a reciprocating compressor in which the novel unloading device uses a valve ring having tabs.

FIGURE 11 is a sectional view taken along lines 11—11 of FIGURE 10 and shows the novel unloading device with the openings in the non-aligned position.

FIGURE 12 is a sectional view of the novel unloading device with the openings in the aligned position.

FIGURE 13 is a vertical section of a reciprocating compressor in which the novel unloading device uses a strip valve.

FIG. 14 is a sectional view taken along lines 14—14 of FIGURE 13 and shows the novel unloading device with the openings in the non-aligned position.

FIGURE 15 is a sectional view of the novel unloading device with the openings in the aligned position.

In the embodiment of the invention shown in FIGURES 1 through 7 the novel unloading device is disposed in a reciprocating compressor, designated generally as 20. It will be understood that while only a single cylinder compressor is shown the scope of the present invention is intended to include both single cylinder and multi-cylinder compressors, as will be understood by those skilled in the art.

Compressor 20 as shown in FIGURES 1 and 2 includes a cylinder 22 in which a piston 24 operates. Cylinder 22 is defined by a wall or liner 26 the inner diameter of which is engaged by sealing rings 28 of piston 24. In the form shown the cylinder wall 26 also serves as the outer casing, the component to which it would otherwise be associated with in the multi-cylinder form. A cylinder head 30 is secured to cylinder wall 26 by any well known means and is provided with a suction inlet 32 in communication with annular suction chamber 34. An angular partition 36 separates chambers 34 from a discharge chamber 38 which communicates with outlet 40. A valve plate 42 is suitably connected between cylinder wall 26 and cylinder head 30 and may have gaskets on either or both sides thereof, such as gasket 44 to prevent leakage through the connecting joints. Valve plate 42 has a central discharge opening 46 which permits communication between cylinder 22 and discharge chamber 38. Radially outwardly of opening 46 a plurality of suction ports 48 are circularly disposed in spaced relationship to each other to permit communication between cylinder 22 and suction chamber 34. A discharge valve 50 is urged by spring 52 to normally close discharge opening 46. A suction valve 54 may be in the form of an annular ring, the outer periphery of which extends into recess 56 formed in cylinder wall 26. Form 54 is shown in the closed position which would normally prevent communication between suction chamber 34 and cylinder 22. Valve 54 will move up or down within recess 56 with the limit of its downward travel being set by annular shoulder 58, while the uppermost travel will be against valve plate 42 as shown.

The lower end of cylinder wall 26 defines a crankcase chamber 60 having a crankshaft 62 disposed therein and connected to a suitable source of rotatable power (not shown). Connected to crankshaft 62 is a connecting rod 64 the upper end of which is engaged by a connecting pin 66 affixed to piston 24 so that piston 24 is reciprocated in cylinder 22 on rotation of crankshaft 62. Discharge valve 50 is positioned on the upper side of valve plate 42 and suction valve 54 is positioned on the lower side of valve plate 42. Valves 50 and 54 each operate responsive to the pressure exerted on the sides thereof and in the normal construction of such valves they are positioned so that when one is open the other will be closed. As piston 24 travels downwardly the pressure exerted on the lower side of suction valve 54 is less than that exerted on the upper side thereof so that valve 54 will move downwardly from the position shown in FIGURE 2 to permit communication from suction inlet 32 and annular suction chamber 34 through suction ports 48 into cylinder 22. On the downward stroke of piston 24 discharge valve 50 will remain against valve plate 42 to close off discharge opening 46. On the upward stroke of piston 24 suction valve 54 will close off suction ports 48 and on the pressure being built up sufficiently to overcome the force of spring 52 discharge valve 50 will open to permit the compressed fluids to be discharged from cylinder 22 through opening 46 into discharge chamber 38 and outlet 40. During normal operation of compressor 20 fluids will continuously be drawn into cylinder 22 from suction inlet 32 and suction chamber 34 to be compressed therein and subsequently discharged into chamber 38 and outlet 40.

The novel unloading device, designated generally as 70, as shown in FIGURES 2 and 3, includes among other things valve 54 and actuating means 72. Actuating means 72 may be manual( not shown) or automatically operative responsive signals from controller 74 which monitors the desired operative capacity or startup condition of reciprocating compressor 20. Controllers 74 will activate or deactivate solenoid 76 to load or unload compressor 20 as more fully explained hereinafter.

Ring valve 54 has a plurality of holes 78 disposed in spaced relationship to each other and of a corresponding size and number as suction port 48.

FIGURE 3 shows hole 78 in a non-aligned position to suction port 48 so that suction valve 54 would be able to open or close suction port 48 by having the cross-sectional area thereof extend across each port 48. In this position suction valve 54 would operate in the normal manner to open or close port 48 responsive to the pressures exerted on either side thereof.

Solenoid 76 is suitably connected to the boss 80 extending from cylinder wall 26. A passage or bore 82 extends from the center of boss 80 through cylinder wall 26, with part of the passage opening into cylinder 22. A control rod 84 has one end disposed in solenoid 76 and extends through bore 82 so that the other end thereof is disposed in the passage in cylinder wall 26 remote from solenoid 76. A pin 86 is suitably connected, as by threading or welding, to control rod 84 in the area that the control rod 84 extends through cylinder 22. Pin 86 extends vertically from control rod 84 and is slidably disposed in a slot 88, as shown in FIGURES 3 and 4.

The position of rod 84 in FIGURES 3 and 4 corresponds to the loaded position of unloading device 70 in which holes 78 are non-aligned with suction ports 48 and solenoid 76 is unactivated. In this position suction valve 54 as shown in FIGURES 2 and 5 will have the cross-sectional area thereof disposed across suction port 48 so as to permit normal operation of reciprocating compressor 20 through the usual opening and closing of valve 54.

However, on signal from controllers 74 solenoid 76 will be activated to urge rod 84 in the position shown in FIGURE 6 so that the pin has been drawn from its initial position adjacent to one side of the opening of bore 82 to a second position adjacent the other side nearest to solenoid 76 causing valve 54 to rotate an amount sufficient to place hole 78 in alignment to suction port 48. The effect of placing hole 78 and suction port 48 in alignment to each other is to unload cylinder 22 by permitting suction inlet 32 and suction chamber 34 to be continuously in communication with cylinder 22 so that regardless of the reciprocation of piston 24 there will be no pressure build-up in cylinder 22. Thus discharge valve 50 will remain continuously closed, while suction valve 54 will remain continuously "open." FIGURE 7 shows a side elevation of the aligned position of valve 54 in which the openings of suction port 48 and hole 78 correspond so as to provide for the continuous communication between suction inlet 32, suction chamber 34, and cylinder 22. It would be optional to associate springs or other positioning means with suction valve 54, which addition would not substantially change the operation of the present invention and is within the intended scope thereof.

The rotational movement of ring valve 54 and the means for accomplishing the same does not require a substantial amount of clearance space in the cylinder and accordingly will not cause a decreased volumetric deficiency.

Unlike some prior art unloading methods the present novel unloading device 70 requires a very small actuating force to position the valve 54 in the aligned position during unloading of compressor 20, or to reposition valve 54 in the normal operative position in which the holes 78 are in the unaligned position. Therefore, the actuating means 72 which function to create this force may be relatively small and inexpensive.

In the embodiment of the invention shown in FIGURE 8 the novel unloader device 70a is shown with a suction valve 54a in which the inner periphery thereof has a plurality of cutouts 100 alternatively disposed between inwardly extending tabs 102 of sufficient area to cover suction ports 48 during normal operation of compressor 20. Except for the change in the configuration of suction valve 54a, the operation and remaining structure of compressor 20 would be the same as that described hereinbefore. On activation of control rod 84, pin 86 (engaged in slot 88) will cause rotation of suction valve 54a so that the cutouts are positioned in alignment with suction ports 48 to place compressor 20 in an unloaded condition.

In the embodiment of the invention shown in FIGURE 9 the novel unloading device 70b is substantially the same as that shown and described hereinbefore under FIGURES 1 through 7 except that valve plate 42b has replaced valve plate 42 and suction valve 54b has replaced suction valve 54. In this construction there are radially spaced alternate rows of slots 110 formed in valve plate 42b. Slots 112 are formed in valve 54b and shown in a nonaligned position to the slots 110 in valve plate 42b so that compressor 20 would be in the loaded position for the normal operation thereof. Once again on activating rods 84 and 86 would cause valve 54b to rotate and thus place slots 112 and 110 in alignment to each other to effectuate unloading of compressor 20.

In the embodiment of the invention shown in FIGURES 10, 11, and 12 the novel unloading device 70c is disposed in a compressor 20c. Except for the differences noted hereinafter compressor 20c and unloading device 70c will be substantially the same as compressor 20 and unloading device 70.

Valve 54c has a smaller outer diameter than the diameter of cylinder 22c and has three tabs 120 extending outwardly therefrom. The tabs remote from rod 84 are disposed in recesses 122. The vertical travel of tab 120 in recesses 122 is limited between valve plate 42 and shoulder 124 to likewise restrict the vertical travel of valve 54c. A third recess 126 is formed with sufficient depth so as to house control rod 84 and pin 86 therein. Thus rod 84 will be completely removed from cylinder 22 to prevent any possibility of the creation of a clearance problem between rod 84 and piston 24. Pin 86 extends from rod 84 to engage the tab 120 in recess 126. Rod 84 is slidably disposed in bore 82c and will operate substantially as described hereinbefore. Valve 54c has holes 78c formed therein substantially similar to the holes 78 explained earlier. Likewise, suction ports 48c are identical to suction port 48. FIGURES 10 and 11 show holes 78c of valve 54c in the non-aligned position so that valve 54c will open and close suction ports 48c in the normal operative manner. On activation of rod 84, pin 86 will urge the tab 120 to which it is engaged, to rotate in the direction of boss 80c causing valve 54c in likewise motion so that holes 78c are placed in alignment with suction port 48c, as shown in FIGURE 12, to permit continuous unloading of cylinder 22c of compressor 20c.

In the embodiment of the invention shown in FIGURES 12, 14, and 15 the novel unloading device 70d is incorporated in a reciprocating compressor 20d.

Compressor 20d has the usual reciprocating piston 24d slidably engaged in cylinder 22d for compressing a fluid entering from inlet 32d into suction chamber 34d for passage through suction ports 48d shown in two rows of three each, though this number and configuration could be altered as desired. A partition 36d is disposed in cylinder head 30d to form a discharge chamber 38d having a discharge valve 50d disposed therein to normally close discharge opening 46d. Spring 52d maintains discharge valve 50d in its normally closed position. Discharge opening 46d and suction ports 48d are formed in valve plate 42d. Strip valve 54d extends into the uppermost part of cylinder 22d and covers suction ports 48d. Strip valve 54d operates responsive to the pressure exerted on either side thereof so that when the pressure in cylinder 22d is less than the pressure in suction chamber 34d the valve will be drawn downwardly to open suction ports 48d and permit the passage of fluids therethrough into cylinder 22d. After compression of the fluid in cylinder 22d it will be discharged past discharge valve 50d into discharge chamber 38d and finally out of outlet 40d.

Strip valve 54d is shown in FIGURE 14 in the non-aligned position whereby holes 78d therein are not in alignment with suction ports 48d so that strip valve 54d will operate to open and close suction ports 48d in the usual manner.

FIGURE 15 shows strip valve 54d in the unloaded position whereby holes 78d are in alignment with one row of suction ports 48d, while the other row of suction ports 48d is completely uncovered. In this position cylinder 22d is continuously in communication with suction chamber 34d and compressor 20d is in an unloaded condition.

Housing 140 extends inwardly from cylinder wall 26d to house part of the actuating means 72d. A chamber 142 is formed within housing 140 which opens into cylinder 22d. Recesses 144 are formed at the upper end on either side of chamber 142 and have the outer edges of strip valve 54d disposed therein to permit the sliding engagement between valve 54d and housing 140. Boss 80d extends outwardly of cylinder wall 26d at a point adjacent housing 140 and has a solenoid 76d suitably affixed thereto. A rod 84d extends from solenoid 76d into chamber 142 wherein the rod may assume either of two positions depending on whether the solenoid has been activated or deactivated. FIGURE 14 shows the rod in the position it will assume on deactivation of solenoid 76d which positions valve 54d in the normal operative position with holes 78d in non-alignment to suction ports 48d. FIGURE 15 shows the position of rod 84d with solenoid 76d activated whereby holes 78d are placed in alignment with one row of ports 48d while the other row is completely uncovered. In this position the compressor 20d is unloaded. A controller (not shown) will control the activation and deactivation of solenoid 76d. A pin 85d is connected to one end of strip valve 54d and will move strip valve 54d into the aligned or non-aligned position responsive to the positioning of control rod 84d to load or unload cylinder 22d of compressor 20d.

Of course, strip valve 54d is made of flexible material which would enable it to move responsive to pressure differential exerted on either side thereof.

It will be understood by those skilled in the art that it is within the scope of the present invention (1) to locate the actuating means adjacent the valve plate and have the control rod extend through the valve plate so as to engage the suction valve in order to control the aligned and non-aligned positions of the suction valve; (2) instead of rotating the suction valve, the valve plate could be rotated so as to provide for the aligning and non-aligning to take place between the respective openings and holes in the valve plate and the suction valves in order to selectively unload and load the cylinder; (3) the actuating means could have been manual, mechanical (such as gear or cam operated), other types of electrical, or fluid operated (such as gas or oil used to move a diaphragm or piston); (4) if the present invention where embodied in a multi-cylinder compressor then the unloading device could be operated on the cylinders singularly, plurally or segmentally; and (5) any combination of the above.

It will be understood that various changes in the details, materials, arrangements of parts and operating conditions which have been herein described and illustrated in order to explain the nature of the invention may be made by those skilled in the art within the principles and scope of the invention as expressed in the claims.

What is claimed is:

1. In a compressor the combination of:
   (a) a cylinder and head therefor;
   (b) a piston in the cylinder being reciprocally movable toward and away from the head;
   (c) an inlet valve seat in the head having a series of annularly spaced inlet ports therein;
   (d) an annular guide groove in the periphery of the cylinder for guiding a ring plate valve element;
   (e) a ring plate valve element having its outer edge in the cylinder guide groove and being axially movable in the groove toward and away from the valve seat, the inside edge of the ring having a contour which forms inwardly projecting tabs which may be aligned with the inlet ports;
   (f) an outlet valve in the center of the annular valve seat; and
   (g) means for rotating the plate valve in the groove between a first position in which the tabs are aligned with the ports to provide an automatic valving action in response to the differential pressure across the valve as the piston reciprocates, and a second position in which the tabs are not aligned with the ports and the cylinder is unloaded.

2. A valve for a piston type compressor comprising:
   (a) a housing;

(b) an annular guide groove in the periphery of said housing for guiding a ring plate valve element;
(c) an annular valve seat having a series of circumferentialy spaced inlet ports therein;
(d) a ring plate valve element having its outer edge in said guide groove and being axially movable in the groove toward and away from said valve seat, the inside edge of said ring plate having a contour which forms inwardly projecting tabs which may be aligned with said inlet ports;
(e) means for rotating the ring valve between a first position in which said tabs of said ring are aligned with said inlet ports to provide an automatic valving action in response to a differential pressure across the valve as the compressor piston reciprocates and a second position in which the tabs do not cover said ports, thereby unloading said compressor.

References Cited

UNITED STATES PATENTS

| | | | |
|---|---|---|---|
| 1,197,936 | 9/1916 | Ivens | 137—512.15 |
| 1,623,489 | 4/1927 | Naab | 230—24 |
| 1,820,272 | 8/1931 | Gumpper | 251—139 |
| 1,919,195 | 7/1933 | Blom | 230—24 |
| 2,122,050 | 6/1938 | Stuart | 230—225 |
| 2,526,922 | 10/1950 | Aldinger | 230—24 |
| 2,767,905 | 10/1956 | Creed | 230—22 |
| 2,961,148 | 11/1960 | Courtney | 230—24 |
| 3,112,063 | 11/1963 | Larsson | 230—231 |

FOREIGN PATENTS 2,905   2/1910   Great Britain.

DONLEY J. STOCKING, *Primary Examiner.*

W. J. KRAUSS, *Assistant Examiner.*